(12) United States Patent
Herzig et al.

(10) Patent No.: US 6,759,094 B2
(45) Date of Patent: Jul. 6, 2004

(54) BRANCHED ORGANOSILOXANE (CO) POLYMERS AND THEIR USE AS ANTIMISTING ADDITIVES FOR SILICONE COATING COMPOSITIONS

(75) Inventors: Christian Herzig, Feichten/Waging am See (DE); Reinhard Stallbauer, Gumpersdorf/Zeilarn (DE); Christine Weizhofer, Kirchdorf (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/198,524

(22) Filed: Jul. 17, 2002

(65) Prior Publication Data
US 2003/0055194 A1 Mar. 20, 2003

(30) Foreign Application Priority Data
Jul. 19, 2001 (DE) ......... 101 35 305
Mar. 21, 2002 (DE) ......... 102 12 659

(51) Int. Cl.$^7$ ................ B05D 3/00
(52) U.S. Cl. ............ 427/387; 528/31; 528/25; 556/431; 556/479; 556/451; 556/445; 525/479
(58) Field of Search ............ 427/387; 528/31, 528/25; 556/431, 479, 451, 445; 525/479

(56) References Cited

U.S. PATENT DOCUMENTS

| | | | |
|---|---|---|---|
| 5,241,034 A | | 8/1993 | Herzig et al. |
| 5,276,095 A | | 1/1994 | Hoxmeier |
| 5,691,435 A | | 11/1997 | Herzig et al. |
| 5,760,145 A | | 6/1998 | Herzig et al. |
| 6,034,225 A | | 3/2000 | Weidner et al. |
| 6,093,782 A | * | 7/2000 | Herzig et al. |
| 6,184,407 B1 | | 2/2001 | Yoshitake et al. |
| 6,258,913 B1 | | 7/2001 | Herzig et al. |
| 6,265,497 B1 | | 7/2001 | Herzig et al. |
| 6,274,692 B1 | | 8/2001 | Herzig et al. |

FOREIGN PATENT DOCUMENTS

| | | |
|---|---|---|
| DE | 2 321 557 | 2/1974 |
| DE | 37 18 588 C1 | 9/1988 |
| DE | 195 22 144 A1 | 1/1997 |
| DE | 196 29 053 A1 | 1/1998 |
| EP | 0 716 115 A2 | 6/1996 |
| EP | 0 915 120 A2 | 5/1999 |
| EP | 1 010 715 A1 | 6/2000 |
| WO | WO 01/98420 | 12/2001 |

OTHER PUBLICATIONS

English Derwent Abstract AN 1998–087924 [09] Corresponding To DE 196 29 053 A1.
English Derwent Abstract AN 1997–053209 [06] Corresponding To DE 195 22 144 A1.
Polymer Preprints 34 (1), 77 (1993).
Polymer Preprints 39 (1), 581 (1998).
PMSE—Preprints 80, 139 (1999).
Caiguo, Gong et al., PMSE—Preprint, vol. 83, 1999, pp. 139–140.
Caiguo, Gong et al., J. Polym. Sci. Part A, Polym. Chem., vol. 38, (2000), pp. 2970–2978.
L.J. Nathias et al., Polym. Prep., Am. Chem. Soc. Div. Polym. Chem., vol. 32 (1992), pp. 82–83.
English Derwent Abstract AN 1988–271953 [39] Corresponding To DE 37 18 588.
English Derwent Abstract AN 1974–11757V [07] Corresponding To DE 23 21 557.

* cited by examiner

*Primary Examiner*—Kuo-Liang Peng
(74) *Attorney, Agent, or Firm*—Brooks Kushman P.C.

(57) ABSTRACT

Branched organosiloxane (co)polymers comprising the structural elements of the formula $$Y[-C_nH_{2n}-(R_2SiO)_m-A_p-R_2Si-G]_x \quad (I)$$

where Y is a tri- to decavalent, optionally heteroatom-containing hydrocarbon radical,
R is a monovalent, optionally halogenated hydrocarbon radical,
A is a radical of the formula $-R_2Si-R^2-(R_2SiO)_m-$, in which $R^2$ is a divalent hydrocarbon radical,
G is a monovalent radical of the formula $-C_fH_{2f-2}-Z$ or a divalent radical of the formula $-C_nH_{2n}-$ bonded to a further radical Y,
Z is a monovalent hydrocarbon radical which is free from terminal aliphatic carbon-carbon multiple bonds, and is inert toward SiH groups in hydrosilylation reactions,
x is an integer from 3 to 10, f is an integer from 2 to 12, k is 0 or 1, n is an integer from 2 to 12, m is an integer which is at least 1, and p is 0 or a positive integer,
with the proviso that the branched organosiloxane (co) polymers contain on average at least one group Z.

10 Claims, No Drawings

BRANCHED ORGANOSILOXANE (CO) POLYMERS AND THEIR USE AS ANTIMISTING ADDITIVES FOR SILICONE COATING COMPOSITIONS

BACKGROUND OF THE INVENTION

1. Field of the Invention

The invention relates to branched organosiloxane (co) polymers whose branching is composed of at least trivalent organic building blocks and whose ends are formed by organic groups attached via Si—C bonds, to a process for their preparation, and to their use as antimisting additives for reducing the formation of aerosols during manufacture of crosslinkable silicone coating compositions.

2. Background Art

Branched organopolysiloxanes whose branching units correspond to customary monoalkylsiloxy units are described in U.S. Pat. No. 5,670,686. Starting from prefabricated siloxanes containing three or four hydrodimethylsiloxy units, a single-stage hydrosilylation process produces branched siloxanes having different end groups. Polysiloxanes with higher degrees of branching are not described; all branching sites correspond to those derived from conventional silicone chemistry. The "hydro" precursors, such as tris-[dimethylsiloxy]allylsilane, are prepared in a hydrolytic process and purified by distillation.

Siloxanes of higher molecular weight can be obtained only by equilibration. In such equilibration reactions, it is necessary to use acidic catalysis, which is not fully satisfactory with siloxanes containing alkylsiloxy units. The need for acidic catalysis is dictated by the fact that, in the case of substances containing hydrosiloxy groups, basic catalysis leads to chemical decomposition.

Products with higher degrees of branching can be obtained according to Polymer Preprints 34(1), 77 (1993) from an $AB_3$ monomer by using tris[dimethylsiloxy] allylsilane as monomer and by noble metal catalysis obtaining a highly branched carbosiloxane intermediate containing hydrodimethylsiloxy end groups which is then reacted with α-unsaturated organic compounds. This method, involving polyaddition, requires the preparation of an extremely high-energy monomer whose handling represents a considerable safety risk. The branching is based exclusively on customary T units ($SiO_{3/2}$ units). Siloxanes containing dialkylsiloxy units are not described and are also virtually unobtainable by known methods. A similar methodology is described in PMSE Prepr. 80, 139 (1999): H dendrimers are obtained from bis[dimethylsiloxy]methylvinylsilane by polyaddition and are subsequently reacted with α-unsaturated organic compounds.

DE-A 195 22 144 describes branched siloxane copolymers which are obtained from compounds containing at least 3 double bonds reactive with respect to hydrosilylation, reacting these compounds with α,ω-dihydrosiloxanes, and subsequently reacting the intermediates generated in the $1^{st}$ stage with α,ω-dienes such as 1,5-hexadiene. For the preparation of branched siloxanes, however, this process is unsuitable, giving only insoluble gels, particularly if, for economic reasons and in consideration of the desired product purity, the use of relatively large excesses of α,ω-dienes is avoided. Moreover, branched products which are inert toward hydrosiloxanes cannot be prepared in this way.

Regular dendrimers are obtainable in accordance with Polymer Preprints 39 (1), 581 (1998) if tetraallylsilane is reacted repeatedly with methyldichlorosilane and subsequently with an allyl-Grignard solution. The dendrimers are allyl-functional and can be hydrosilylated in a subsequent reaction.

Conventional dendrimers are obtained in accordance with U.S. Pat. No. 6,184,407 by reacting siloxanes containing two or more SiH groups with vinylalkoxy silanes and exchanging the now polymer-bound alkoxy groups hydrolytically for SiH-containing siloxy groups to give dendrimers which are able in turn to react with vinyl-functional components. The preparation process is complicated and expensive.

A trend within the silicone coating industry is to increase machine speed in order to raise productivity. Where silicone coatings are applied to a substrate at relatively high speeds, for example speeds of more than 300 m/min, fine spray mists of the silicone coating system may be formed. These aerosols are formed at the silicone applicator unit. The formation of this spray mist proves to be a serious problem in the context of further increases in the coating speed, and can be reduced by adding what are known as antimisting additives to the silicone coating system.

EP-A 716 115 (Dow Corning Corp.) describes antimisting additives obtained by reacting an organosilicon compound, a compound containing oxyalkylene groups, and a catalyst. The addition of these oxyalkylene-functional reaction products to crosslinkable silicone coating systems reduces the formation of aerosols in rapid coating processes. The antimisting additives, which contain polyglycol groups, have the disadvantage, however, that they are poorly miscible with the crosslinkable silicone coating compositions.

WO 01/98420 (Dow Corning Corp.) discloses a liquid silicone antimisting composition obtained by reacting an organohydropolysiloxane containing at least 2 Si—H groups with an organoalkenylsiloxane containing at least 3 alkenyl groups in the presence of a platinum catalyst, and optionally, an inhibitor, in a C=C/SiH ratio ≧4.6. An extremely large excess of organoalkenylsiloxane (C=C) is needed in order to prevent gelling. This excess influences the release properties of the base system, i.e., the crosslinkable silicone coating composition. It is generally necessary rather than optional to include an inhibitor in order to prevent gelling.

SUMMARY OF THE INVENTION

It is an object of the present invention to provide moderately to highly branched organosiloxane (co)polymers which bear Si—C-bonded organic groups at branch termini, and which can be prepared simply without complicated multistage processes, while at the same time avoiding the use of starting materials which are expensive and/or hazardous to handle. Thus, one object of the invention is to avoid use of "monomeric" building blocks such as tris [dimethylsiloxy]allylsilane which are not only expensive, but in addition do not allow any variability in chain length between the branching sites, and which pose a high safety risk when handling. A further object of the invention is to provide antimisting additives for crosslinkable silicone coating compositions which reduce the formation of aerosols in rapid coating processes, which are readily miscible with the silicone coating compositions, and which do not impair the performance of silicone coating compositions.

DETAILED DESCRIPTION OF THE PREFERRED EMBODIMENTS

The invention provides branched organosiloxane (co)polymers comprising the structural elements of the formula $$Y[-C_nH_{2n}-(R_2SiO)_m-A_p-R_2Si-G]_x \qquad (I)$$

where

Y is a tri- to decavalent, preferably tri- to tetravalent, hydrocarbon radical which may contain one or more heteroatoms selected from the group consisting of oxygen, nitrogen and silicon atoms, R independently are identical or different monovalent, optionally halogenated hydrocarbon radicals having from 1 to 18 carbon atoms per radical, A is a radical of the formula $-R_2Si-R^2-(R_2SiO)_m-$, in which $R^2$ is a divalent hydrocarbon radical having from 2 to 30 carbon atoms which can be interrupted by one or more non-adjacent oxygen atoms, preferably from 1 to 4 oxygen atoms, G is a monovalent radical of the formula $-C_fH_{2f-2k}-Z$ or a divalent radical of the formula $-C_nH_{2n}-$, the second bond being to a further radical Y, Z is a monovalent hydrocarbon radical which is free from terminal aliphatic carbon-carbon multiple bonds, which is inert toward SiH groups in hydrosilylation reactions, and which can contain one or more heteroatoms selected from the group consisting of oxygen, nitrogen, boron, silicon and titanium, or is a monovalent polymer radical having more than 20 carbon atoms, x is an integer from 3 to 10, preferably 3 or 4, f is an integer from 2 to 12, preferably 2, k is 0 or 1, n is an integer from 2 to 12, preferably 2, m is an integer which is at least 1, preferably an integer from 1 to 1000, and p is 0 or a positive integer, preferably 0 or an integer from 1 to 20, with the proviso that the branched organosiloxane (co)polymers contain on average at least one group Z.

The invention further provides a process for preparing branched organosiloxane (co)polymers, which comprises in a first step, reacting compounds (1) containing at least three aliphatic double bonds, of the formula $$Y(CR^1=CH_2)_x$$

where Y and x are as defined above and $R^1$ is a hydrogen atom or an alkyl radical having from 1 to 10 carbon atoms;

with organopolysiloxanes (2) of the general formula $$H(R_2SiO)_m-A_p-R_2SiH$$

where A, R, m and p are as defined above, in the presence of catalysts (3) which promote the addition of Si-bonded hydrogen onto aliphatic multiple bonds, commonly referred to as hydrosilylation catalysts, and in a second step reacting the resulting branched intermediates (5) containing Si-bonded hydrogen atoms with organic compounds (4) of the formula $$C_fH_{2f-2k-1}-Z$$

selected from among $H_2C=CR^3-Z$ when k=0 (4a), and $R^4C\equiv C-Z$ when k=1 (4b), in which $R^3$ and $R^4$ have the definition of $R^1$ and f, k and Z are as defined above, in the presence of catalysts (3) which promote the addition of Si-bonded hydrogen onto aliphatic multiple bonds.

In an optional third step, the branched organosiloxane (co)polymers of the invention obtained by addition reaction of organic compounds (4) with the branched intermediates (5) may be further modified, as a result of which the substituent Z introduced in the second step is chemically altered. This procedure is particularly advantageous when a group Z in compound (4) exerts inhibiting properties on the second reaction step, for example phosphorus-containing or sulfur-containing groups Z, or when products of this kind are difficult or impossible to prepare.

In order, for example, to obtain organosiloxane polymers having urea substituents (Z=$-CH_2NHCONHC_{18}H_{37}$), it is advantageous in the second step to employ allylamine (Z=$-CH_2NH_2$) and to subsequently react the amino functionality with octadecyl isocyanate. The direct addition of N-allyl-N'-octadecylurea, in contrast, proceeds sluggishly and incompletely. For the preparation of amine-opened epoxide substituents, allyl glycidyl ether may favorably be reacted with (5) and the product then reacted with an amine (e.g., $NHR_2$). The direct addition reaction of (4) where Z=$-CH_2OCH_2CH(OH)CH_2NR_2$ leads to unwanted secondary reactions. Mercapto compounds such as $CH_2=CHCH_2O_2CCH_2SH$ cannot be hydrosilylated at all with Pt catalysis. In order to prepare an organosiloxane polymer where Z=$-CH_2O_2CCH_2SH$, therefore, allyl alcohol is employed in a second step, and subsequently, the product is esterified with thioglycolic acid. Alternatively, hydrosilylation of allyl chloroacetate may take place, following which $-Cl$ is exchanged for $-SH$.

The organosiloxane (co)polymers of the invention therefore also include radicals Z which cannot be added on directly by way of the compound (4). This also applies to oligomeric or polymeric compounds (4). A preferred preparation method for polyester substituents (Z=$-CH_2[O_2C(CH_2)_4]_nOH$), for example, is the addition reaction of ally alcohol with (5) in the second step, with subsequent attachment of caprolactone by polymerization. It is also more advantageous first to addition-react an unsaturated compound (4) containing an initiator group (e.g., Z=$-C_6H_4-C(CH_3)_2Cl$) with the intermediate (5) in a second step and thereafter to attach (meth)acrylates by polymerization, using known techniques, than to carry out direct addition of allyl-terminated poly(meth)acrylates, which gives rise to considerable compatibility problems.

The organopolysiloxane (co)polymers of the invention with a branched structure fundamentally comprise chainlike siloxane blocks whose ends are connected to the structural elements Y and/or Z by way in each case of a $C_fH_{2f}$ or $C_fH_{2f-2}$ bridge. The greater the extent to which siloxane blocks are connected on both sides to elements Y, the greater the degree of branching in the products. In general, the construction of the organosiloxane (co)polymers of the invention is such that siloxane blocks and organic blocks alternate with one another, with the branching structures and the ends being composed of organic blocks.

In the organosiloxane (co)polymers of the invention the ratio of end groups Z to branching groups Y (Z/Y ratio) is preferably from 1.0 to 2.0, more preferably from 1.1 to 1.5.

The organosiloxane (co)polymers of the invention preferably possess a viscosity of from 50 to 50,000,000 mPa·s at 25° C., more preferably from 500 to 5,000,000 mPa·s at 25° C., and most preferably from 1,000 to 1,000,000 mPa·s at 25° C.

Examples of radicals R are alkyl radicals such as the methyl, ethyl, n-propyl, iso-propyl, n-butyl, iso-butyl, tert-butyl, n-pentyl, iso-pentyl, neo-pentyl, and tert-pentyl radicals, hexyl radicals such as the n-hexyl radical, heptyl radicals such as the n-heptyl radical, octyl radicals such as the n-octyl radical and iso-octyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as o-, m-, and p-tolyl radicals, xylyl radicals and ethylphenyl radicals; and aralkyl radicals such as the benzyl radical and the α- and the β-phenylethyl radicals.

Examples of halogenated radicals R are haloalkyl radicals such as the 3,3,3-trifluoro-n-propyl radical, the 2,2,2,2',2', 2'-hexafluoroisopropyl radical, the heptafluoroisopropyl radical, and haloaryl radicals, such as the o-, m- and p-chlorophenyl radicals.

The radical R is preferably a monovalent hydrocarbon radical having from 1 to 6 carbon atoms, the methyl radical being particularly preferred.

Examples of alkyl radicals $R^1$ are the methyl, ethyl, n-propyl, iso-propyl, n-butyl, iso-butyl, tert-butyl, n-pentyl, iso-pentyl, neo-pentyl, and tert-pentyl radicals, hexyl radicals such as the n-hexyl radical, heptyl radicals such as the n-heptyl radical, octyl radicals such as the n-octyl radical and iso-octyl radicals such as the 2,2,4-trimethylpentyl radical, nonyl radicals such as the n-nonyl radical, and decyl radicals such as the n-decyl radical. $R^1$ is preferably a hydrogen atom.

Examples of radicals $R^2$ are those of the formulae —(CH$_2$)$_2$—, —(CH$_2$)$_4$—, —(CH$_2$)$_6$—, —(CH$_2$)$_8$—, —(CH$_2$)$_{10}$—, —C$_6$H$_4$—, —C$_2$H$_4$C$_6$H$_4$C$_2$H$_4$—, —C(CH$_3$) CH$_2$C$_6$H$_4$CH$_2$C(CH$_3$)—, and —C$_2$H$_4$-norbornanediyl-.

Examples of radicals $R^1$ apply in their entirety to radicals $R^3$ and $R^4$. $R^3$ is preferably a hydrogen atom, and $R^4$ is preferably a hydrogen atom as well.

In the first process step, the addition of the SiH group of (2) onto the CH$_2$=CR$^1$ group of (1), known as hydrosilylation, leads, as is known to the skilled artisan, to the formation of two isomers as follows:

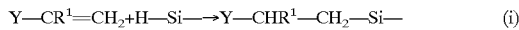

(i)

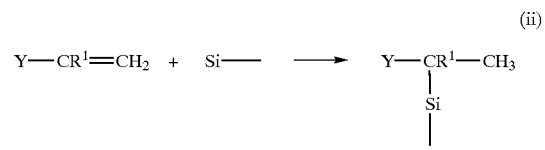

(ii)

The —C$_n$H$_{2n}$ group in (I) of the organosiloxane (co) polymers of the invention embraces this isomerization and therefore preferably denotes the isomeric radicals

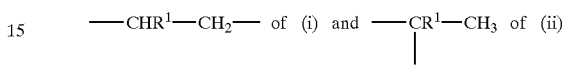

and n is therefore the total number of carbon atoms in the CH$_2$=CR$^1$ group of (1). Since $R^1$ is preferably a hydrogen atom, n is preferably 2.

In the process of the invention it is possible to use one kind of compound (1) or different kinds of compound (1).

Examples of compounds (1) with which the branched organosiloxane (co)polymers of the invention can be prepared are 1,2,4-trivinylcyclohexane, 1,3,5-trivinylcyclohexane, 3,5-dimethyl-4-vinyl-1,6-heptadiene, 1,2,3,4-tetravinylcyclobutane, methyltrivinylsilane, tetravinylsilane, and 1,1,2,2-tetraallyloxyethane, preference being given to 1,2,4-trivinylcyclohexane.

Examples of the radical Y are therefore those of the formula

(iii)

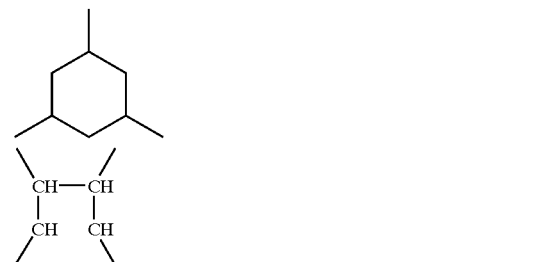

(iv)

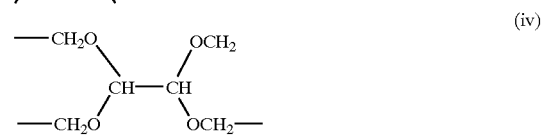

preference being given to the radical of the formula

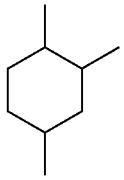

(v)

In the process of the invention it is possible to use one kind of organopolysiloxane (2) or multiple kinds of organopolysiloxane (2). The compound used as organopolysiloxane (2) is a substantially linear polymer, p is preferably 0, and m is preferably an integer from 5 to 400. Organopolysiloxane (2) is used in the first process step in amounts such that the ratio of Si-bonded hydrogen in organopolysiloxane (2) to aliphatic double bonds in compound (1) is preferably at least 1.5, more preferably from 1.5 to 20, yet more preferably from 1.5 to 5.0, and most preferably from 1.5 to 3.0.

Since organopolysiloxane (2) is preferably used in excess, in the first process step, all of the aliphatic double bonds in the compound (1) are reacted, and branched organosiloxane (co)polymers (5) are obtained which contain Si-bonded hydrogen atoms. In the case of low molecular weight organopolysiloxanes (2) where p=0 and m=1–6, subsequent distillative removal of the excess organopolysiloxane (2) enables obtaining intermediates (5) virtually free from organopolysiloxane (2). In other cases, excess organopolysiloxane (2) may be preferably left in the reaction mixture, thereby diluting the intermediates (5). In order to obtain soluble, i.e., noncrosslinked intermediates (5), therefore, it is preferred to use a molar ratio of SiH in (2) to C=C in (1) of at least 1.5. The requisite molar ratio depends on the respective structure of (1) and on the index x and may be determined by the skilled artisan by means of routine experiments.

As catalysts (3) which promote the addition of Si-bonded hydrogen onto aliphatic multiple bonds, catalysts which have been generally used for promoting the addition of Si-bonded hydrogen onto aliphatic multiple bond may be employed. The catalysts are preferably a metal from the group of the platinum metals or a compound or complex thereof. Examples of such catalysts are metallic and finely divided platinum, which may be supplied on supports such as silica, alumina or activated carbon, compounds or complexes of platinum such as platinum halides, e.g., $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes such as platinum-1,3-divinyl-1,1,3,3-tetramethyldisiloxane complexes with or without a detectable inorganically bonded halogen content, bis(gamma-picoline)platinum dichloride, trimethylenedipyridineplatinum dichloride, dicyclopentadieneplatinum dichloride, dimethyl-sulfoxide-ethyleneplatinum(II) dichloride, cyclooctadieneplatinum dichloride, norbornadieneplatinum dichloride, gamma-picolineplatinum dichloride, cyclopentadieneplatinum dichloride, and reaction products of platinum tetrachloride with olefins and primary amines or secondary amines or with both primary and secondary amines, such as the reaction product of a solution of platinum tetrachloride in 1-octene with sec-butylamine, or ammonium-platinum complexes.

In the first process step the catalyst (3) is preferably used in amounts of from 0.2 to 20 ppm by weight (parts by weight per million parts by weight), more preferably in amounts of from 1 to 10 ppm by weight, calculated in each case as elemental platinum and based on the overall weight of compound (1) and organopolysiloxane (2).

The first process step is preferably conducted at the pressure of the surrounding atmosphere, i.e., approximately at 1020 hPa (abs.), but may also be conducted at higher or lower pressures. Furthermore, the first process step is preferably conducted at a temperature of from 20° C. to 150° C., more preferably from 40° C. to 100° C.

Since the compound (1) containing at least three aliphatic double bonds, e.g., 1,2,4-trivinylcyclohexane, tends toward polymerization at relatively high temperatures, it is possible in the first process step to add a radical inhibitor, such as 4-methoxyphenol, 2,6-bis(tert-butyl)-4-methylphenol, phenothiazine, hydroquinone or pyrocatechol. The radical inhibitors are preferably used in amounts of from 10 to 500 ppm by weight, based on the overall weight of compound (1) and organopolysiloxane (2).

In both the first and the second process steps it is possible to use organic solvents, preferably inert organic solvents. Examples of inert organic solvents are toluene, xylene, octane isomers, heptane isomers, butyl acetate, 1,2-dimethoxyethane, tetrahydrofuran, and cyclohexane. The inert organic solvents, where used, may be removed by distillation after the first or second process step or may remain in the reaction mixture.

The organic compounds (4) contain aliphatic C—C double or triple bonds which are reactive toward Si—H groups in hydrosilylation reactions and which undergo addition reaction with them to form Si—C bonds. If k=0 the reactive group contains a double bond and the organic compound (4) is a compound (4a) of the formula $H_2C=CR^3$—Z. If k=1 the reactive group contains a triple bond and the organic compound (4) is a compound (4b) of the formula $R^4C\equiv C$—Z.

The addition reaction of the SiH group in the intermediate (5) with the double or triple bond in (4a) or (4b) brings about the formation of isomers, as is known to the skilled worker, as follows:

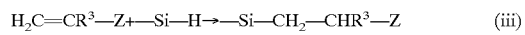

(iii)

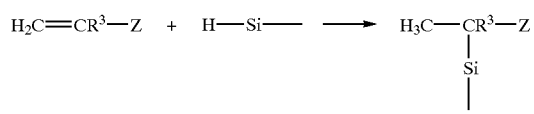

(iv)

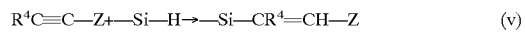

(v)

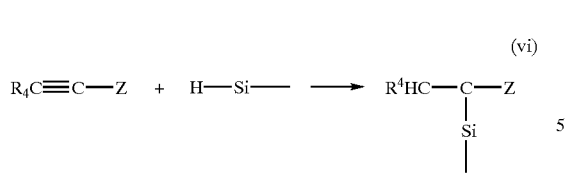 (vi)

The —$C_fH_{2f-2k}$— group in (I) of the organosiloxane (co)polymers of the invention embraces this isomerization and therefore denotes preferably the isomeric radicals

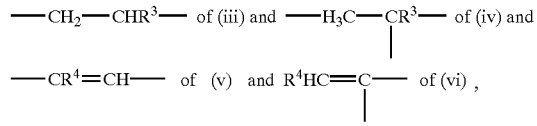

and f is therefore the total number of carbon atoms in the $H_2C=CR^3$— group of (4a) or the $R^4C\equiv C$— group of (4b). Since $R^3$ and $R^4$, are preferably hydrogen atoms, f is therefore preferably 2.

Examples of the $H_2C=CR^3$— group in the organic compound (4a) are $H_2C=CH—$, $H_2C=C(CH_3)—$, $H_2C=C(C_4H_9)—$, and $H_2C=C(C_8H_{17})—$. Examples of the $R^4C\equiv C$— group in the organic compound (4b) are $HC\equiv C—$, $CH_3C\equiv C—$, and $C_4H_9C\equiv C—$.

The radical Z attached to the double or triple bond in (4a) or (4b) may contain not only carbon atoms and hydrogen atoms but also one or more heteroatoms selected from the group consisting of oxygen, nitrogen, boron, silicon, and titanium. The radical Z is not reactive toward SiH groups in a hydrosilylation reaction, or exhibits very low reactivity. The unsaturated compound (4) may therefore contain functional groups, such as hydroxyl, ether, ester, amido, urethane, urea, amino, oximo, imino, carboxyl, carbonyl or epoxy groups. It preferably contains no groups which substantially hinder the hydrosilylation reaction.

Examples of radicals Z are

—$(CH_2)_5CH_3$, —$(CH_2)_9CH_3$, —$(CH_2)_{15}CH_3$, —$C(CH_3)_2$ OH, —$(CH_2)_4OH$, —$OC_4H_9$, —$CO_2CH_3$, —$(CH_2)_8$ $CO_2C_3H_7$, —$(CH_2)_8CON(C_2H_5)_2$, —$CH_2O_2CNHC_{18}H_{37}$, —$CH_2NHCONHC_{18}H_{37}$, —$CH_2NH_2$, —$(CH_2)_8CO_2H$, —$CO_2H$, —$COCH_3$,

—$CH_2OCH_2CH(OH)CH_2NH—CH_3$, —$CH_2OCH_2CH(OH)CH_2N(CH_3)_2$, —$CH_2OCH_2CH(OH)CH_2NH(CH_2)_3N(CH_3)_2$, —$CH_2OCH_2CH(OH)CH_2N(CH_3)_3N(CH_3)_2)_2$, —$C(CH_3)_2Cl$, —$C(CH_3)_2I$, —$C(CH_3)_2O_2CCH_3$, —$C(CH_3)_2O_3CCH_3$, —$C(CH_3)_2O_2H$, —$C(CH_3)_2O_2C(CH_3)_3$ —$C(CH_3)=CH_2$, —$C_6H_4C(CH_3)=CH_2$, —$C_6H_4C(CH_3)_2Cl$, —$C_6H_4C(CH_3)_2OH$, —$C_6H_4C(CH_3)_2O_2H$, —$C_6H_4C(CH_3)_2O_2CCH_3$, —$C_6H_4C(CH_3)_2O_2CCH_2Cl$, and —$C_6H_4$ $C(CH_3)_2O_3CCH_3$.

Examples of radicals G are therefore

—$(CH_2)_7CH_3$, —$(CH_2)_{11}CH_3$, —$(CH_2)_{17}CH_3$, —$(CH_2)_2C(CH_3)_2OH$, —$CH=CH—C(CH_3)_2OH$, —$(CH_2)_6$ OH, —$(CH_2)_2OC_4H_9$, —$(CH_2)_2CO_2CH_3$, —$(CH_2)_{10}CO_2CO_2C_3H_7$, —$(CH_2)_{10}CON(C2H_5)_2$, —$(CH_2)_3O_2CNHC_{18}H_{37}$, —$(CH_2)_3NHCONHC_{18}H_{37}$, —$(CH_2)_3NH_2$, —$(CH_2)_{10}CO_2H$, —$(CH_2)_2CO_2H$, —$(CH_2)_2COCH_3$, and

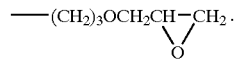

The unsaturated compound (4) may be monomeric, oligomeric or polymeric in nature. Accordingly, the definition of Z is also met by organic radicals which contain polyether, polyester, polyurethane, polyurea, polyamide, polyolefin, polyacrylate or polyacetal groups. Preferred polymer radicals are polyether, polyester, polyolefin, and polyacrylate.

Examples of organic compounds (4a) are $CH_2=CH(CH_2)_5CH_3$, $CH_2=CH(CH_2)_{15}CH_3$, $CH_2=CH—C(CH_3)_2OH$, $CH_2=CH(CH_2)_4OH$, $CH_2=CHOC_4H_9$, $CH_2=CHCO_2CH_3$, $CH_2=CH(CH_2)_8CO_2C_3H_7$, $CH_2=CH(CH_2)_8CON(C_2H_5)_2$, $CH_2=CH—CH_2O_2CNHC_{18}H_{37}$, $CH_2=CH—CH_2NH_2$, $CH_2=CH(CH_2)_8CO_2H$, $CH_2=CH—COCH_3$, and

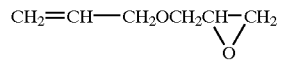

Examples of organic compounds (4b) are $CH\equiv C—C_6H_5$, $CH\equiv C—CH_2OH$, $CH\equiv C—C(CH_3)_2OH$, $CH\equiv C—CH_2OC_4H_9$, $CH\equiv C—CO_2H$, $CH\equiv C—CO_2C_2H_5$, and $CH\equiv C—CH_2O_2CNHC_{18}H_{37}$.

Examples of oligomeric/polymeric organic compounds (4) are those oligomers/polymers which contain a multiple bond which is reactive with respect to hydrosilylation, such as polyethers started from allyl alcohol, polyethers started from alkanols and subsequently allylated, polycaprolactam started from allyl alcohol, and also olefins and acrylates which are anionically polymerized and are terminated with an unsaturated cationic compound such as dimethylvinylchlorosilane. Optionally it is also possible to polymerize olefins such as isobutene cationically, and to terminate the polymer with an anionic compound such as an alkenyl-Grignard, in order to produce compounds (4) used in accordance with the invention.

In the second process step, it is possible to use one kind of compound (4) or different kinds of compound (4). It is possible to use one or more compounds (4) simultaneously or in succession and it is therefore also possible to incorporate two or more different functions into the branched organosiloxane (co)polymers of the invention.

In the second process step, the organic compound (4) is used in amounts such that the ratio of aliphatic double bond in (4a) and/or aliphatic triple bond in (4b) to Si-bonded hydrogen in the intermediate (5) obtained in the first process step is preferably from 0.5 to 2.0, more preferably from 1.05 to 2.0, with particular preference from 1.05 to 1.5.

The compound (4) may be used in a substoichiometric or superstoichiometric amount, based on the intermediate (5). Where a substoichiometric amount (4) is used, branched organosiloxane (co)polymers are obtained which in addition to functional group Z introduced via (4) also contain reactive SiH groups. One preferred version for the preparation of the branched organosiloxane (co)polymers of the invention is, however, the use of at least an equimolar amount of (4), i.e., the use of an equal amount or more of the reactive multiple bonds in (4), based on the SiH groups in (5). A preferred stoichiometry ratio is therefore situated within the range from 1.05 to 2.0.

When conducting the second process step it is possible to meter compound (4) into the catalyzed intermediate (5) or vice versa. It is preferred, however, to introduce the compound (4) with catalyst (3) as the initial charge, and then to meter in the intermediate (5). Insofar as the heat generated by this hydrosilylation reaction is fairly low, it is advantageous to start a mixture of (4) and (5) with catalyst (3) at an appropriate temperature; in an adiabatic regime, the warming of the reaction mixture is a measure of the progress of the reaction. If the compound (4) is volatile, the excess compound (4) can be removed by distillation; otherwise, it may remain in the end product.

In the second process step the catalyst (3) is used preferably in amounts of from 0.5 to 50 ppm by weight, more preferably in amounts of from 2 to 20 ppm by weight, calculated in each case as elemental platinum and based on the overall weight of organic compound (4) and intermediate (5) obtained in the first process step. The second process step is preferably conducted under the pressure of the surrounding atmosphere, i.e., approximately at 1020 hPa (abs.), but may also be conducted at higher or lower pressures. Furthermore, the second process step is preferably conducted at a temperature of from 20° C. to 150° C., more preferably from 40° C. to 120° C.

Non-limiting examples of branched organosiloxane (co) polymers of the invention include those prepared as indicated below.

If, for example, in the first process step 1,2,4-trivinylcyclohexane (1) is reacted with $H(Me_2SiO)_7Me_2SiH$ (2) and in the second process step the intermediate (5) obtained in the first process step and containing Si-bonded hydrogen atoms is reacted with 1-octene (4), a compound obtained has, for example, the formula:

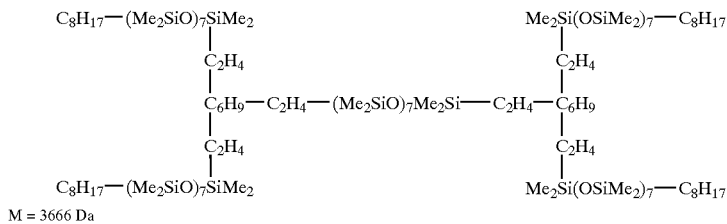

If in the first process step methyltrivinylsilane (1) is reacted with $H(Me_2SiO)_{190}Me_2SiH$ (2) and in the second process step the intermediate (5) obtained in the first process step and containing Si-bonded hydrogen atoms is reacted with 3-methylbut-1-yn-3-ol of the formula $HC{\equiv}C-C(Me_2)-OH$ (4), a compound obtained has, for example, the formula:

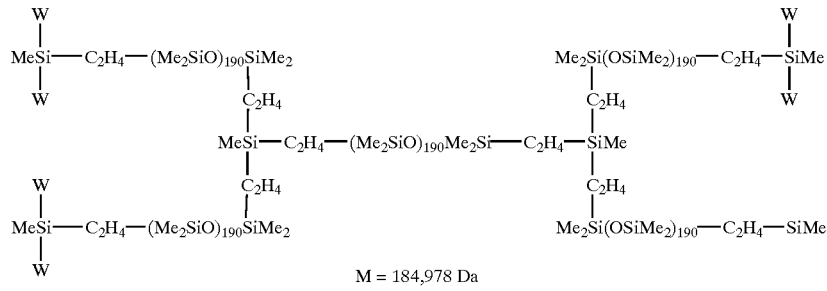

In order to prepare the branched organosiloxane (co)polymers of the invention it is also possible to perform steps 1 and 2 of the process of the invention simultaneously, which depending on the nature of the compounds (1), (2), and (4) may lead to products having modified properties, where this is desired.

Similarly, steps 1 and 2 may be conducted in reverse order. In this case organopolysiloxane (2) is reacted in excess with compound (4) in the presence of catalyst (3) and subsequently the intermediate containing Si-bonded hydrogen atoms is reacted with compound (2) in the presence of catalyst (3). In order, with the process in reverse order, to obtain products having comparable properties as with the normal, preferred process, it is necessary to adapt the proportions of the compounds (1), (2), and (4) that are used accordingly.

Where the catalyst (3) retains its activity beyond the $1^{st}$ process step, it is also possible to forego renewed addition of catalyst (3) for the $2^{nd}$ process step.

Depending on their individual structure and the nature of the substituents G, the products of the invention may be used for very varied fields of application. From a technical standpoint they are suitable as additives for regulating rheology, as compatibilizers, emulsifiers, crosslinkers, crosslinkable polymers, and copolymers for producing shaped bodies and coating compositions.

One particular feature of products of the invention is that a siloxane parent structure is substituted by numerous structural elements G in sterically equivalent positions, in other words differently than is known for siloxanes with comblike substitution. It is therefore possible to combine silicone quality with very different polarity in a highly variable way. Fields of application are therefore in the cosmetics industry, in the paints and inks industry, in the additives sector, in the detergent and cleaning industry, and in plastics technology.

The invention further provides for the use of antimisting additives in crosslinkable silicone coating compositions for the purpose of reducing the formation of aerosols, wherein the antimisting additives comprise the branched organosiloxane (co)polymers of the invention, or are branched organosiloxane (co)polymers prepared by the process of the invention.

The antimisting additives of the invention, the branched organosiloxane (co)polymers, have the advantage that they not only reduce the formation of aerosols by crosslinkable silicone coating compositions in rapid coating systems, but are also particularly miscible, at least in the proportions used, homogeneously with the crosslinkable silicone coating compositions, in contrast to the polyglycol-functional antimisting additives of EP-A 716 115, cited at the outset.

Moreover, the antimisting additives of the invention do not exhibit any inhibiting effect and are stable on storage. The antimisting additives of the invention have the advantage that they can be blended beforehand with the polymer component (A) of the crosslinkable silicone coating composition. They are therefore easy to handle and do not adversely affect the release properties of the base system, the crosslinkable silicone coating composition.

The branched organosiloxane (co)polymers used as antimisting additives preferably have a viscosity of from 400 to 5,000,000 mPa·s at 25° C., more preferably from 400 to 1,000,000 mPa·s at 25° C.

As antimisting additives it is preferred to use those branched organosiloxane (co)polymers which have high degrees of branching. The extent of the branching is established by the step in which compound (1) is reacted. Preferred additives are obtained by operating within the more preferred stoichiometric ranges indicated.

For reducing the formation of aerosols the antimisting additives of the invention are preferably added to the crosslinkable silicone coating compositions. The antimisting additives of the invention, the branched organosiloxane (co)polymers, are preferably used in the crosslinkable silicone coating compositions in amounts of from 0.5 to 10% by weight, more preferably from 1 to 5% by weight, based on the overall weight of the crosslinkable silicone coating compositions.

As crosslinkable silicone coating compositions it is preferred to use those comprising (A) organosilicon compounds having radicals containing aliphatic carbon-carbon multiple bonds, (B) organosilicon compounds containing Si-bonded hydrogen atoms, (C) catalysts which promote the addition of Si-bonded hydrogen onto aliphatic multiple bond, and if desired, (D) inhibitors.

The invention further provides crosslinkable silicone coating compositions featuring reduced aerosol formation, comprising (X) antimisting additives of the invention, (A) organosilicon compounds having radicals containing aliphatic carbon-carbon multiple bonds, (B) organosilicon compounds containing Si-bonded hydrogen atoms, (C) catalysts which promote the addition of Si-bonded hydrogen onto aliphatic multiple bond, and if desired, (D) inhibitors.

For the crosslinkable silicone coating compositions it is preferably to employ a single antimisting additive (X) of the invention. However, it is also acceptable to employ multiple antimisting additives (X) of the invention.

As organopolysiloxanes (A) having radicals containing aliphatic carbon-carbon multiple bonds it is preferred to use linear or branched organopolysiloxanes comprising units of the general formula $$R^5_zR^6_ySiO_{\frac{4-z-y}{2}}, \tag{II}$$

where $R^5$ is a monovalent, unsubstituted or substituted, hydrocarbon radical having from 1 to 18 carbon atoms per radical and is free from aliphatic carbon-carbon multiple bonds, and $R^6$ is a monovalent hydrocarbon radical having from 2 to 8 carbon atoms per radical containing a terminal aliphatic carbon-carbon multiple bond, z is 0, 1, 2 or 3, y is 0, 1 or 2 and the sum z+y is 0, 1, 2 or 3, with the proviso that there are on average at least 1.5 radicals $R^6$, preferably on average at least 2 radicals $R^6$ per organopolysiloxane (A).

Preferred organosilicon compounds (A) are organopolysiloxanes of the general formula

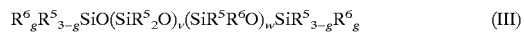  (III)

where $R^5$ and $R^6$ are as defined above, g is 0, 1 or 2, v is 0 or an integer from 1 to 1500, and w is 0 or an integer from 1 to 200, with the proviso that on average at least 1.5 radicals $R^6$, preferably on average at least 2 radicals $R^6$, are present.

In the context of this invention formula (III) is to be understood to mean that v units —$(SiR^5{}_2O)$— and w units —$(SiR^5R^6O)$— may be distributed in any fashion in the organopolysiloxane molecule.

As organosilicon compounds (A) it is also possible to use branched polymers containing terminal ω-alkenyl groups, preferably Si-bonded vinyl groups, as described in U.S. Pat. No. 6,034,225, especially column 1 line 43 to column 2 line 13, and U.S. Pat. No. 6,258,913, especially column 1 line 62 to column 2 line 35. As organosilicon compounds (A) it is also possible to use linear organopolysiloxanes as described in U.S. Pat. No. 6,274,692, especially column 2 lines 3 to 27, which do not have an aliphatically unsaturated hydrocarbon radical such as an Si-bonded vinyl group at both ends, but instead also have aliphatically saturated hydrocarbon radicals, such as Si-bonded methyl groups, at the ends. As organosilicon compounds (A) it is also possible to use those described in U.S. Pat. No. 5,241,034, especially column 16 line 23 to column 17 line 35, DE-A 195 22 144, especially page 2 lines 44 to 67, DE-A 196 29 053, especially page 2 line 51 to page 3 line 29, U.S. Pat. No. 5,760,145, especially column 2 line 46 to column 4 line 23, and U.S. Pat. No. 6,265,497, especially column 2 lines 3 to 47. All the preceding U.S. and German patents are incorporated herein by reference.

The organopolysiloxanes (A) preferably possess an average viscosity of from 100 to 10,000 mPa·s at 25° C.

Examples of hydrocarbon radicals $R^5$ are alkyl radicals such as the methyl, ethyl, n-propyl, iso-propyl, n-butyl, iso-butyl, tert-butyl, n-pentyl, iso-pentyl, neo-pentyl, and tert-pentyl radicals, hexyl radicals such as the n-hexyl radical, heptyl radicals such as the n-heptyl radical, octyl radicals such as the n-octyl radical and iso-octyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methyl-cyclohexyl radicals, aryl radicals such as the phenyl, naphthyl, anthryl and phenanthryl radicals; alkaryl radicals such as o-, m-, and p-tolyl radicals, xylyl radicals, and ethylphenyl radicals; and aralkyl radicals such as the benzyl radical, and the α- and the β-phenylethyl radicals.

Examples of radicals $R^6$ are alkenyl radicals, such as the vinyl, 5-hexenyl, allyl, 3-butenyl and 4-pentenyl radical; and alkynyl radicals, such as the ethynyl, propargyl and 1-propyne radical.

As organosilicon compounds (B) which contain Si-bonded hydrogen atoms it is preferred to use linear, cyclic or branched organopolysiloxanes comprising units of the general formula

  (IV)

where $R^5$ is as defined above, e is 0, 1, 2 or 3, f is 0, 1 or 2 and the sum of e+f is 0, 1, 2 or 3, with the proviso that there are on average at least 2 Si-bonded hydrogen atoms. The organosilicon compounds (B) preferably contain at least 3 Si-bonded hydrogen atoms.

As organosilicon compounds (B) it is more preferred to use organopolysiloxanes of the general formula

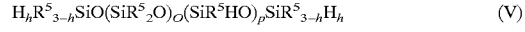  (V)

where $R^5$ is as defined above, h is 0, 1 or 2, o is 0 or an integer from 1 to 1500, and p is 0 or an integer from 1 to 200, with the proviso that there are on average at least 2 Si-bonded hydrogen atoms.

In the context of this invention formula (V) is to be understood to mean that o units —$(SiR^5{}_2O)$— and p units —$(SiR^5HO)$— may be distributed in any fashion in the organopolysiloxane molecule.

Examples of such organopolysiloxanes are, in particular, copolymers comprising dimethylhydrosiloxane, methylhydrosiloxane, dimethylsiloxane and trimethylsiloxane units; copolymers comprising trimethylsiloxane, dimethylhydrosiloxane and methylhydrosiloxane units; copolymers comprising trimethylsiloxane, dimethylsiloxane and methylhydrosiloxane units; copolymers comprising methylhydrosiloxane and trimethylsiloxane units; copolymers comprising methylhydrosiloxane, diphenylsiloxane and trimethylsiloxane units; copolymers comprising methylhydrosiloxane, dimethylhydrosiloxane and diphenylsiloxane units; copolymers comprising methylhydrosiloxane, phenylmethylsiloxane, trimethylsiloxane and/or dimethylhydrosiloxane units; copolymers comprising methylhydrosiloxane, dimethylsiloxane, diphenylsiloxane, trimethylsiloxane and/or dimethylhydrosiloxane units; and copolymers comprising dimethylhydrosiloxane, trimethylsiloxane, phenylhydrosiloxane, dimethylsiloxane and/or phenylmethylsiloxane units.

As organosilicon compounds (B) it is also possible to use those as described in U.S. Pat. No. 5,691,435, especially column 3 line 45 to column 4 line 29, herein incorporated by reference. The organopolysiloxanes (B) preferably possess an average viscosity of from 10 to 1,000 mPa·s at 25° C.

Organosilicon compound (B) is used preferably in amounts such that from 0.5 to 3.5, more preferably from 1.0 to 3.0, gram atoms of Si-bonded hydrogen are supplied per mole of Si-bonded radical containing aliphatic carbon-carbon multiple bond in the organosilicon compound (A).

In the crosslinkable silicone coating compositions, it is possible to employ the same catalysts which promote the addition of Si-bonded hydrogen onto aliphatic multiple bonds, which have been employed previously to promote the addition of Si-bonded hydrogen onto aliphatic multiple bonds. As constituent (C) it is preferred to use the abovementioned catalysts (3). The catalysts (C) are preferably used in amounts of from 10 to 1000 ppm by weight, more preferably from 50 to 200 ppm by weight, calculated in each case as elemental platinum metal and based on the overall weight of the organosilicon compounds (A) and (B).

The crosslinkable silicone coating compositions may comprise agents which retard the addition of Si-bonded hydrogen onto aliphatic multiple bonds at room temperature, known as inhibitors (D). Examples of inhibitors (D) are 1,3-divinyl-1,1,3,3-tetramethyldisiloxane, benzotriazole, dialkylformamides, alkylthioureas, methyl ethyl ketoxime, organic compounds or organosilicon compounds having a boiling point of at least 25° C. at 1012 mbar (abs.) and containing at least one aliphatic triple bond, such as 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, 3,7-dimethyloct-1-yn-6-en-3-ol, a mixture of diallyl maleate and vinyl acetate, maleic monoesters, and inhibitors such as the compound of the formula $HC\equiv C-C(CH_3)(OH)-CH_2-CH_2-CH=C(CH_3)_2$, available commercially under the trade name "Dehydrolinalool" from BASF. Where inhibitors (D) are used, they are preferably employed in amounts of from 0.01 to 10% by weight, more preferably from 0.01 to 3% by weight, based on the overall weight of the organosilicon compounds (A) and (B).

Examples of further constituents which may be used in the crosslinkable silicone coating compositions are agents for adjusting the release force, organic solvents, adhesion promoters, and pigments.

Examples of agents for adjusting the release force of the coatings, repellent to tacky substances, that are produced with the compositions of the invention are silicone resins comprising units of the formula $R^7R^5{}_2SiO_{1/2}$ and $SiO_2$, known as MQ resins, where $R^7$ is a hydrogen atom, a hydrocarbon radical $R^5$ such as the methyl radical, or an alkenyl radical $R^6$ such as the vinyl radical, wherein $R^5$ and $R^6$ are as defined above, and the units of the formula $R^7R^5{}_2SiO_{1/2}$ may be identical or different. The ratio of units of the formula $R^7R^5{}_2SiO_{1/2}$ to units of the formula $SiO_2$ is preferably from 0.6 to 2. The silicone resins are used preferably in amounts of from 5 to 80% by weight, based on the overall weight of the organosilicon compounds (A) and (B).

Examples of organic solvents are petroleum spirits, e.g., mixtures of alkanes having a boiling range of from 70° C. to 180° C., n-heptane, benzene, toluene and xylenes, halogenated alkanes having from 1 to 6 carbon atoms such as methylene chloride, trichloroethylene and perchloroethylene, ethers such as di-n-butyl ether, esters such as ethyl acetate, and ketones such as methyl ethyl ketone and cyclohexanone. Where organic solvents are used, they are preferably employed in amounts of from 10 to 90% by weight, more preferably from 10 to 70 % by weight, based on the overall weight of the organosilicon compounds (A) and (B).

Although the sequence when mixing the constituents (X), (A), (B), (C) and, where used, (D) is not critical, it has nevertheless been found appropriate for practical purposes to add catalyst constituent (C) following admixture of the other constituents.

The crosslinking of the compositions of the invention takes place preferably at from 70° C. to 180° C. As energy sources for thermal crosslinking it is preferred to use ovens, e.g., forced air drying ovens, heating tunnels, heated rollers, heated plates, or infrared radiation. The compositions of the invention may also be crosslinked by irradiation with ultraviolet light or by irradiation with UV and IR light. As ultraviolet light it is common to use light emitting a wavelength of 253.7 nm. In commerce there are a large number of lamps which emit ultraviolet light having a wavelength of from 200 to 400 run and which preferentially emit ultraviolet light having a wavelength of 253.7 nm.

The invention further provides shaped bodies produced by crosslinking the compositions of the invention. The shaped bodies preferably comprise coatings, more preferably coatings which repel tacky substances.

The invention further provides a process for producing coatings by applying crosslinkable compositions of the invention to the surfaces that are to be coated and then crosslinking the compositions.

The crosslinkable compositions of the invention are used preferably for producing coatings which repel tacky substances, e.g., for producing release papers. Coatings which repel tacky substances are produced by applying crosslinkable compositions of the invention to the surfaces that are to be made repellent to tacky substances and then crosslinking the compositions.

The application of the compositions of the invention to the surfaces to be coated, preferably surfaces to be made repellent to tacky substances, may be accomplished in any desired manner which is suitable for the production of coatings from liquid materials; for example, by dipping, brushing, pouring, spraying, rolling, printing, for example, by means of an offset gravure coating apparatus, blade or knife coating, or by means of an airbrush. The coat thickness on the coated surfaces is preferably from 0.3 to 6 $\mu$m, with particular preference from 0.5 to 2.0 $\mu$m.

The surfaces to be coated, preferably surfaces to be made repellent to tacky substances, which may be treated in the context of the invention may be surfaces of any materials which are solid at ambient temperature and pressure. Examples of surfaces of this kind are those of paper, wood, cork, and polymer films, e.g., polyethylene films or polypropylene films, woven and nonwoven fabric of natural or synthetic fibers, ceramic articles, glass, including glass fibers, metals, polyethylene-coated paper, and boards, including those of asbestos. The abovementioned polyethylene may be high-pressure, medium-pressure or low-pressure polyethylene. In the case of paper the paper in question may be of a low-grade kind, such as absorbent papers, including kraft paper which is in the raw state, i.e., has not been pretreated with chemicals and/or natural polymeric substances, and which has a weight of from 60 to 150 g/m$^2$, unsized papers, papers of low freeness value, mechanical papers, unglazed or uncalendered papers, papers which are smooth on one side owing to the use of a dry glazing cylinder during their production, without additional complex measures, and which are therefore referred to as "machine-glazed papers", uncoated papers or papers produced from waste paper, i.e., what are known as recycled papers. The paper to be treated in accordance with the invention may also of course, however, comprise high-grade paper types, such as low-absorbency papers, sized papers, papers of high freeness value, chemical papers, calendered or glazed papers, glassine papers, parchmentized papers or precoated papers. The boards as well may be of high or low grade.

The compositions of the invention are suitable, for example, for producing release, backing, and interleaving papers, including interleaving papers which are employed in the production of cast films or decorative films, or of foam materials, including those of polyurethane. The compositions of the invention are also suitable for producing release, backing, and interleaving cards, films, and cloths, for treating the reverse sides of self-adhesive tapes or self-adhesive sheets or the written faces of self-adhesive labels. The compositions of the invention are additionally suitable for treating packing material, such as that comprising paper, cardboard boxes, metal foils and drums, e.g., cardboard, plastic, wood or iron, which is intended for storing and/or transporting tacky goods, such as adhesives, sticky foodstuffs, e.g., cakes, honey, candies, and meat; bitumen, asphalt, greased materials, and crude rubber. A further example of the application of the compositions of the invention is the treatment of carriers for transferring pressure-sensitive adhesive films in the context of what is known as the transfer process. These uses are exemplary and not limiting.

The crosslinkable silicone coating compositions comprising the antimisting additives of the invention are especially suitable for use in rapid coating systems with coating speeds of preferably from 300 to 1500 m/min, more preferably from 400 to 1000 m/min, in which the compositions of the invention are applied at high speeds to the surfaces that are to be coated.

The compositions of the invention are suitable for producing the self-adhesive materials joined to the release paper, both by the offline method and by the inline method.

In the offline method, the silicone composition is applied to the paper and crosslinked, and then, in a subsequent stage, normally after the winding of the release paper onto a roll and after the storage of the roll, an adhesive film, present for example on a label face paper, is applied to the coated paper and the composite is then compressed. In the inline method the silicone composition is applied to the paper and crosslinked, the silicone coating is coated with the adhesive, the label face paper is then applied to the adhesive, and the composite, finally, is compressed.

In the case of the offline method the winding speed is governed by the time needed to render the silicone coating tack-free. In the case of the inline method the process speed is governed by the time needed to render the silicone coating migration-free. With the compositions of the invention the offline method and the inline method can be operated at speeds from 300 to 1500 m/min, preferably from 400 to 1000 m/min.

EXAMPLE 1

In a glass flask with mechanical stirrer, 108 g of 1,2,4-trivinylcyclohexane are mixed with 1840 g of an $\alpha,\omega$-dihydropolydimethylsiloxane having an active hydrogen (Si-bonded hydrogen) content of 0.18% by weight (SiH/C=C=1.66) and a viscosity of 9 mpa·s at 25° C. and then 1.9 g of a solution of a platinum-1,3-divinyl-1,1,3,3-tetramethyldisloxane complex in an $\alpha,\omega$-divinyldimethylpolysiloxane having a viscosity of 1000 mPa·s at 25° C. with a Pt content of 1.0% by weight (known as the Karstedt catalyst, whose preparation is described in U.S. Pat. No. 3,775,452) are added. The reaction mixture heats up to about 80° C. within a few minutes and is stirred at this temperature for about 1 h. This gives a branched siloxane polymer having a viscosity of 220 mm$^2$/s at 25° C. and an active hydrogen content of 0.067% by weight. In accordance with the synthetic method employed, all of the free siloxane chain ends consist of the highly reactive hydrodimethylsiloxy units.

EXAMPLE 2

100 g (67 mmol of SiH) of the hydrosiloxane polymer prepared in Example 1 are mixed with 9 g of 1-octene (80 mmol of C=C) (C=C/SiH ratio=1.2), the mixture is heated to 100° C. and the reaction is catalyzed with 0.5 mg of platinum in the form of the Karstedt catalyst solution described in Example 1. A slight exotherm indicates onset of the olefin addition reaction, which is over after about 2 h. A test for active hydrogen (Si-bonded hydrogen) gives a conversion of more than 99%. Removal of excess olefin gives a clear product having a viscosity of 320 mn$^2$/s at 25° C. The branched siloxane polymer is modified with octyl groups at the free siloxane chain ends. With silicone oils of medium viscosity it is possible to obtain homogeneous mixtures.

COMPARATIVE EXAMPLE

The procedure of Example 2 is repeated with the modification that, instead of 1-octene, 80 mmol of C=C is used in the form of 1,7-octadiene (C=C/SiH ratio=1.2). Under otherwise identical reaction conditions, with a sharp increase in viscosity a solid which is insoluble in toluene is obtained. The product cannot be homogeneously blended with silicone oil.

EXAMPLE 3

100 g of the hydrosiloxane polymer prepared in Example 1 are metered into a mixture, at 100° C., of 226 g of a monoallylic polyether containing on average 24 oxyethylene and 25 oxypropylene groups, of the formula $CH_2$=CH—$CH_2$—O—$(CH_2CH_2O)_{24}$—$(CH_2CH_2CH_2O)_{25}$—H (C=C/SiH=1.3) and 0.3 g of the Karstedt catalyst solution described in Example 1 (Pt content=1.0% by weight). After a total reaction time of 3 h the active hydrogen (Si-bonded hydrogen) has completely reacted. Cooling to 25° C. gives a clear, highly viscous product: 18,400 mPa·s at 25° C. The free chain ends are modified with linear polyether chains.

EXAMPLE 4

219 g of a linear $\alpha,\omega$-dihydropolydimethylsiloxane having an Si-bonded hydrogen content of 0.014% by weight and a viscosity of 982 mPa·s at 25° C. are reacted with 0.75 g of methyltrivinylsilane (SiH/C=C=1.7). The Karstedt catalyst described in Example 1 is metered in at 25° C. in an amount of 10 ppm by weight platinum, based on siloxane, after the reaction mixture has been diluted with half the amount of toluene. The solution is heated to 80° C., and then thickens severely. Thereafter, 1.1 g of 3-methylbut-1-yn-3-ol (C=C/SiH=1.05) are added and the reaction is allowed to continue to completion at 100° C. for 1 hour. Concentration of a sample of the solution by evaporation in a dish gives a highly branched siloxane polymer having a very high viscosity, whose chain ends have OH functions. The polymer can again be dissolved in toluene to give a clear solution.

EXAMPLE 5

672 g (450 mmol of SiH) of the hydrosiloxane polymer prepared in Example 1 are turbulently mixed with 1025 g (585 mmol of C=C) of a monoallyl-terminated polyether comprising equal molar amounts of ethylene oxide and propylene oxide (C=C/SiH=1.3) and the mixture is heated to 100° C. Then 3.5 g of a solution of hexachloroplatinic acid in isopropanol (0.48% Pt) are added. With a slight exotherm, the mixture becomes homogeneous after about 10 minutes. It is stirred at 100° C. for 3 h more to give a highly branched polyethersiloxane having a viscosity of 14,970 mm$^2$/s (25° C.). The $^1$H-NMR spectrum shows an SiH conversion of about 99%.

EXAMPLE 6

672 g of the hydrosiloxane polymer prepared in Example 1 are heated to 100° C. A mixture of 90 g of propoxylated allyl alcohol with an iodine number of 110 (231 g of polyether/mol C=C) and 2.2 g of hexachloroplatinic acid solution (0.48 % Pt) is run in slowly and reaction is allowed to continue to completion for 2 h (C=C/SiH=1.16). Following complete consumption of SiH, a clear oil is obtained with a viscosity of 520 mm$^2$/s at 25° C.

EXAMPLE 7

In order to prepare a highly branched OH-terminated siloxane without polyether groups, Example 5 is repeated, but employing instead of 1025 g of allyl polyether, only 43 g of 2-methyl-3-buten-2-ol (C=C/SiH=1.11). In less than 1 h at 100° C., complete SiH conversion is obtained. The excess of 5 g of tertiary alcohol is removed at 120° C. to give a clear multihydroxysiloxane polymer with a viscosity of 410 mm$^2$/s (25° C.).

EXAMPLE 8

Siloxane polymers with even higher degrees of branching may be prepared by further reacting an already highly branched hydrosiloxane polymer with a small amount of a divinyl compound. 384 g of the polymer produced in Example 1 are mixed homogeneously with 44 g of α,ω-divinylsiloxane with an average molar mass of 1104 (Mn) and the mixture is held at 100° C. for 4 h. The original viscosity of the hydrosiloxane polymer subsequently rises to 1100 mm$^2$/s at 25° C., and the active hydrogen (Si-bonded hydrogen) content falls to 0.052% by weight. 50% of the batch is mixed with 25 g of 1-octene (C=C/SiH=2.0) and the mixture is heated to 100° C., with a slightly exothermic reaction ensuing. After 1 h, excess octene is removed in vacuo. This gives a clear, very highly branched oil with a viscosity of 1330 mm$^2$/s at 25° C.

EXAMPLE 9

The second half of the highly branched hydrosiloxane polymer prepared in Example 8, containing 0.052% by weight Si-bonded hydrogen, is mixed with 55 g of 1-octadecene (C=C/SiH=2.0) and heated at 100° C. for 1 h. The siloxane polymer of the invention is diluted by excess olefin, which cannot be removed at 100° C. under standard vacuum, and therefore has a viscosity of only 900 mm$^2$/s at 25° C.

EXAMPLE 10

Inventive products of higher viscosity are also obtainable by using more triene (SiH/C=C=1.56) when preparing the hydrogen component. If, therefore, Example 1 is repeated with 115 g of 1,2,4-trivinylcyclohexane (instead of only 108 g), a more highly branched siloxane polymer of 750 mm$^2$/s (25° C.) is obtained with an Si-bonded hydrogen content of only 0.060% by weight. 200 g of this product are mixed with 27 g of 1-octene (C=C/SiH=2.0) and reaction (which is weakly exothermic) is allowed to continue to completion at 100° C. Excess octene is removed in vacuo after 2 h, to give a clear oil having a viscosity of 1870 mm$^2$/s at 25° C.

Use of the Branched Siloxane (co)polymers as Antimisting Additives:

EXAMPLE 11

At a high application weight and with certain coating formulations, aerosols may be formed even at machine speeds well below 500 m/min. The branched siloxane copolymers of the invention were used, for reducing the formation of aerosol, as additives in crosslinkable silicone coating systems for use in such coating processes.

The standard formulation used was a mixture of 100 parts by weight of a branched polysiloxane containing vinyldimethylsiloxy end groups,
having a viscosity of 420 mPa·s (25° C.) and an iodine number of 8.0, prepared in accordance with example 3 of U.S. Pat. No. 6,034,225;
3.6 parts by weight of a linear polysiloxane comprising hydromethylsiloxane and trimethylsiloxane units in a molar ratio of 24:1;
1.04 parts by weight of a 1% strength by weight (based on elemental platinum) solution of a platinum-1,3-divinyl-1,1,3,3-tetramethyldisiloxane complex in an α,ω-divinyldimethylpolysiloxane having a viscosity of 1000 mPa·s at 25° C.; and 0.3 part by weight of 1-ethynylcyclohexanol.

The additives of the invention from the preparation examples indicated in table 1 were added to the standard formulation in the amounts specified in table 1. As a control, a standard formulation without inventive additive was used. These mixtures were used for coating paper.

The substrate used was paper from Ahlstrom bearing the designation Glassine Larice Tipo 325, 62 g/m$^2$. Coating was carried out on a pilot coating unit from Dixon with the model number 1060, having a 5-roll applicator unit, at 150 m/min. The application roller was run at 95 % of the paper speed. The coating was cured in a drying oven with a length of 3 m at 140° C.

The formation of aerosol was determined using the Dusttrak Aerosol Monitor Model 8520. Samples were taken between the silicone application roll and the roll nip at a distance of 12 cm from the silicone application roll. Additionally, the formation of aerosol was assessed visually and evaluated with the codes 1–3:

1 no visible aerosol formation
2 slightly visible aerosol formation
3 severe aerosol formation.

During the coating experiments, the maximum indicated aerosol levels were recorded. The coating weight was determined by means of X-ray fluorescence analysis in reference to an appropriate standard, and was 2.5 g/m². The results are summarized in table 1.

TABLE 1

| Additive | Amount of additive in % | Misting, mg/m³ (Dusttrak) | Misting (visual) |
|---|---|---|---|
| Example 5 | 2 | 4.8 | 1.5–2 |
| Example 6 | 2 | 10 | 2 |
| Example 7 | 2 | 6 | 2.5 |
| Example 8 | 5 | 1.5 | 1 |
| Example 9 | 2 | 5 | 2.5 |
| Example 10 | 2 | 2.5 | 1 |
| — | — | 20 | 3 |

The comparative experiments show that the addition of the branched siloxane (co)polymers of the invention, containing organic terminal functions, as antimisting additives markedly reduces the formation of aerosol by crosslinkable silicone coating compositions in rapid coating processes.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A branched organosiloxane (co)polymer comprising structural elements of the formula $$Y[-C_nH_{2n}-(R_2SiO)_m-A_p-R_2Si-G]_x \qquad (I)$$

where
Y is a tri- to decavalent hydrocarbon radical, having from 1 to 25 carbon atoms per radical which may contain one or more heteroatoms selected from the group consisting of oxygen and nitrogen,
R are identical or different monovalent, optionally halogenated hydrocarbon radicals having from 1 to 18 carbon atoms per radical,
A is a radical of the formula $-R_2Si-R^2-(R_2SiO)_m-$, in which $R^2$ is a divalent hydrocarbon radical having from 2 to 30 carbon atoms per radical which can be interrupted by one or more non-adjacent oxygen atoms,
G is a monovalent radical of the formula $-C_fH_{2f-2k}-Z$ or a divalent radical of the formula $-C_nH_{2n}-$ bonded to a further radical Y,
Z is a monovalent hydrocarbon radical which is free from terminal aliphatic carbon-carbon multiple bonds, which is inert toward SiH groups in hydrosilylation reactions, and which contains one or more oxygen, nitrogen, boron, silicon or titanium heteroatoms, or is a monovalent polymer radical having more than 20 carbon atoms,
x is an integer from 3 to 10,
f is an integer from 2 to 12,
k is 0 or 1,
n is an integer from 2 to 12,
m is an integer which is at least 1, and
p is 0 or a positive integer,
with the proviso that the branched organosiloxane (co)polymer contains on average at least one group Z.

2. The branched organosiloxane (co)polymer of claim 1, wherein x is 3 or 4.

3. The branched organosiloxane (co)polymer of claim 1, wherein p is 0.

4. The branched organosiloxane (co)polymer of claim 1, wherein the ratio of end groups Z to branching groups Y is from 1.0 to 2.0.

5. In a process for preparing a crosslinkable silicone coating on a substrate at high machine speeds where aerosol formation occurs, the improvement comprising adding from 0.5 to 10% by weight based on the total weight of the crosslinkable silicone coating composition plus antimisting additive(s), at least one antimisting additive comprising at least one branched organosiloxane (co)polymer comprising structural elements of the formula $$Y[-C_nH_{2n}-(R_2SiO)_m-A_p-R_2Si-G]_x \qquad (I)$$

where
Y is a tri- to decavalent hydrocarbon radical, having from 1 to 25 carbon atoms per radical which may contain one or more heteroatoms selected from the group consisting of oxygen, nitrogen, and silicon,
R are identical or different monovalent, optionally halogenated hydrocarbon radicals having from 1 to 18 carbon atoms per radical,
A is a radical of the formula $-R_2Si-R^2-(R_2SiO)_m-$, in which $R^2$ is a divalent hydrocarbon radical having from 2 to 30 carbon atoms per radical which can be interrupted by one or more non-adjacent oxygen atoms,
G is a monovalent radical of the formula $-C_fH_{2f-2k}-Z$ or a divalent radical of the formula $-C_nH_{2n}-$ bonded to a further radical Y,
Z is a monovalent hydrocarbon radical which is free from terminal aliphatic carbon-carbon multiple bonds, which is inert toward SiH groups in hydrosilylation reactions, and which contains one or more oxygen, nitrogen, boron, silicon or titanium heteroatoms, or is a monovalent polymer radical having more than 20 carbon atoms,
x is an integer from 3 to 10,
f is an integer from 2 to 12,
k is 0 or 1,
n is an integer from 2 to 12,
m is an integer which is at least 1, and
p is 0 or a positive integer,
with the proviso that the branched organosiloxane (co)polymer contains on average at least one group Z, where by formation of aerosol is reduced.

6. The process of claim 5, wherein said crosslinkable silicone coating composition comprises:
(A) organosilicon compounds having radicals containing aliphatic carbon-carbon multiple bonds,
(B) organosilicon compounds containing Si-bonded hydrogen atoms, (C) catalysts which promote the addition of Si-bonded hydrogen onto aliphatic multiple bond, and optionally, (D) inhibitors.

7. A crosslinkable silicone coating composition exhibiting reduced aerosol formation suitable for use in the process of claim 5, comprising (X) at least one antimisting additive comprising structural elements of the formula $$Y[—C_nH_{2n}—(R_2SiO)_m—A_p—R_2Si—G]_x \quad (I)$$

where

Y is a tri- to decavalent hydrocarbon radical, having from 1 to 25 carbon atoms per radical which may contain one or more heteroatoms selected from the group consisting of oxygen, nitrogen, and silicon, R are identical or different monovalent, optionally halogenated hydrocarbon radicals having from 1 to 18 carbon atoms per radical A is a radical of the formula $—R_2Si—R^2—(R_2SiO)_m—$, in which $R^2$ is a divalent hydrocarbon radical having from 2 to 30 carbon atoms per radical which can be interrupted by one or more non-adjacent oxygen atoms, G is a monovalent radical of the formula $—C_fH_{2f-2k}—Z$ or a divalent radical of the formula $—C_nH_{2n}—$ bonded to a further radical Y, Z is a monovalent hydrocarbon radical which is free from terminal aliphatic carbon-carbon multiple bonds, which is inert toward SiH groups in hydrosilylation reactions, and which contains one or more oxygen, nitrogen, boron, silicon or titanium heteroatoms, or is a monovalent polymer radical having more than 20 carbon atoms, x is an integer from 3 to 10, f is an integer from 2 to 12, k is 0 or 1, n is an integer from 2 to 12, m is an integer which is at least 1, and p is 0 or a positive integer, with the proviso that the branched organosiloxane (co) polymer contains on average at least one group Z, (A) organosilicon compound(s) having radicals containing aliphatic carbon-carbon multiple bonds, (B) organosilicon compound(s) containing Si-bonded hydrogen atoms, (C) catalysts which promote the addition of Si-bonded hydrogen onto aliphatic multiple bonds, and optionally, (D) inhibitors.

8. The process of claim 5 wherein the ratio of end groups Z to branching groups Y is from 1.0 to 2.0.

9. The composition of claim 7, wherein x is 3 or 4 and p is 0.

10. The composition of claim 7, wherein the ratio of end groups Z to branching groups Y is from 1.0 to 2.0.

* * * * *